May 8, 1923.
J. REINARTZ
HAM BOILER
Filed July 21, 1920 2 Sheets-Sheet 1
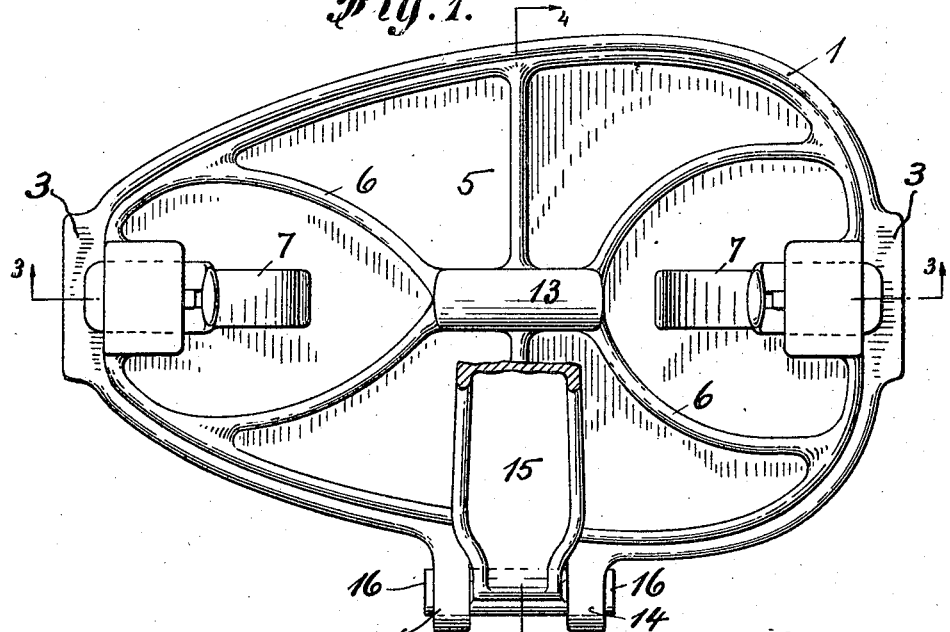
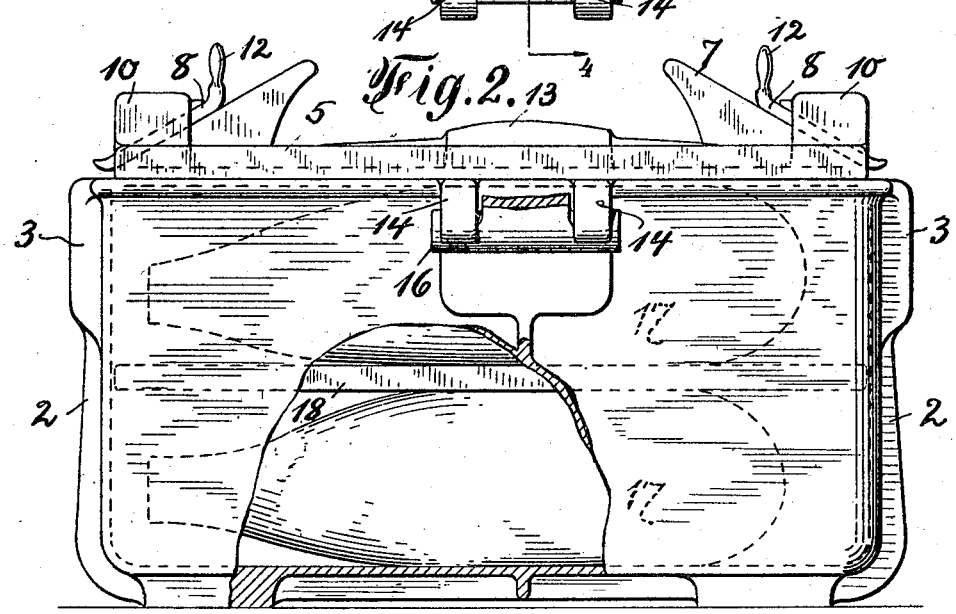
Inventor
Josef Reinartz
By his Attorney May 8, 1923. 1,454,337

J. REINARTZ

HAM BOILER

Filed July 21, 1920 2 Sheets-Sheet 2

Inventor
Josef Reinartz
By his Attorney

Patented May 8, 1923.

1,454,337

UNITED STATES PATENT OFFICE.

JOSEF REINARTZ, OF MOUNT VERNON, NEW YORK.

HAM BOILER.

Application filed July 21, 1920. Serial No. 398,016.

*To all whom it may concern:*

Be it known that I, JOSEF REINARTZ, a citizen of the German Republic, and residing at Mount Vernon, in the county of Westchester and State of New York, have invented certain new and useful Improvements in Ham Boilers, of which the following is a specification, reference being had therein to the accompanying drawing.

My invention relates to ham-boilers, and the object of my invention is to produce a boiler, which is of simple and solid construction and rapid and efficient in operation. To this end, I make a strong vessel of a contour adapted to receive the ham or hams to be treated, and at opposite ends of the vessel, I provide a number of recesses so shaped that a locking bolt slidably mounted on the lid of the vessel automatically engages said recesses, as the lid is forced down into position, the lid thus being prevented from being moved upwards until the bolt is withdrawn. One bolt is provided at each end of the lid.

In order to force the lid down into the vessel, the lid is provided in its center with a cam-like elevation, against which may be pressed a lever, for which a fulcrum is provided on the outside of one of the side walls of the vessel. The fulcrum is constituted by depending curved lugs adapted to be engaged by pivot-pins formed at one end of a hand-lever. Where the vessel is to have a capacity for more than one ham, one or more partitions of the shape of the vessel are used between each two hams.

Figure 3:
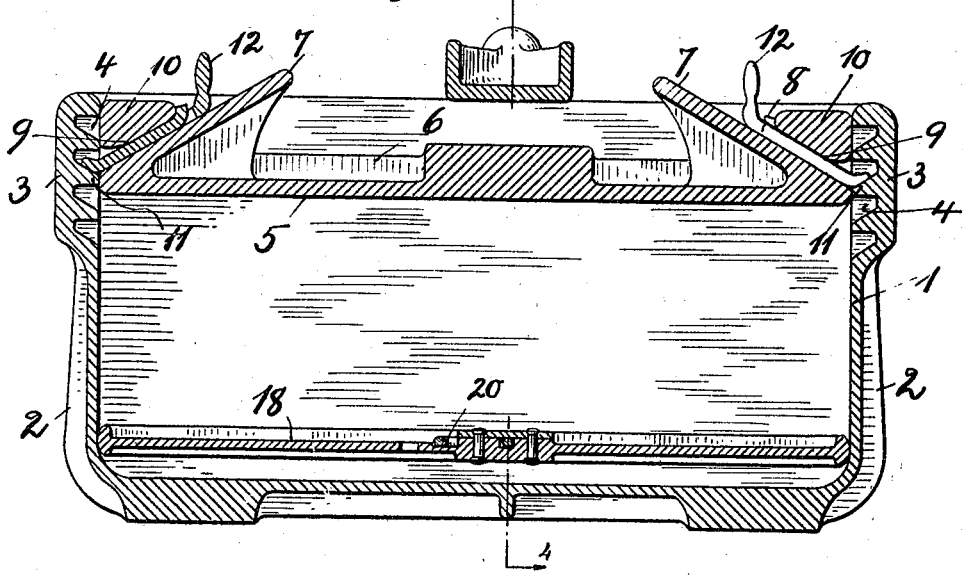
Figure 4:
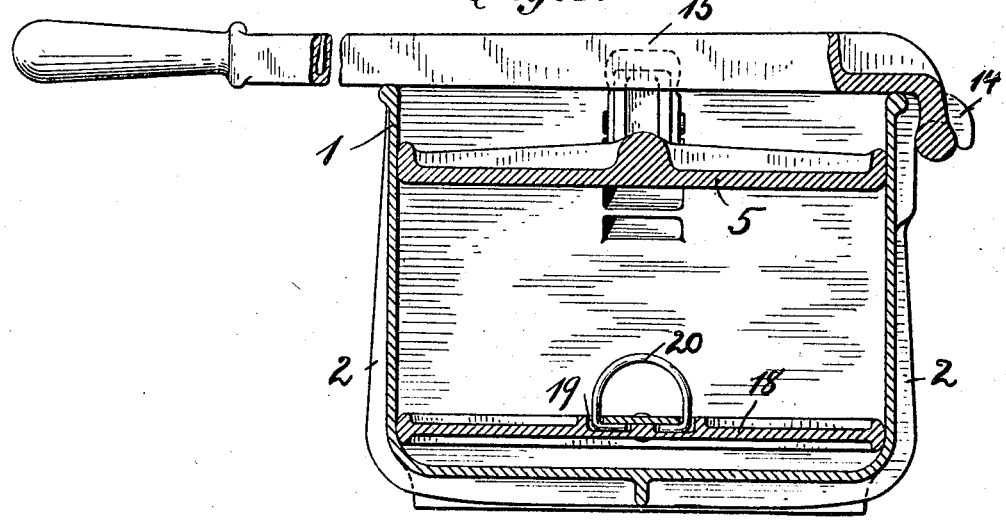

I have illustrated my invention, by way of example, on the accompanying drawing, in which Fig. 1 is a top plan view of the boiler, with the lever broken off to show the cam-like elevation on the lid. Fig. 2 is a side elevation with one side wall of the vessel broken out to show the partition, two hams being indicated in broken lines; Fig. 3 is a longitudinal section along 3—3 in Fig. 1, while Fig. 4 is a transverse section along 4—4 in Fig. 3.

The boiler shown is intended for two hams.

The vessel 1, which is of light but strong construction is of a shape corresponding to the contour of the hams, and it is strengthened by ribs 2. As seen in Fig. 3, the opposite end walls of the vessel have at their upper ends enlargements 3 provided with a number of straight recesses 4. The lid 5, of the same shape as the vessel so as to fit snugly therein is also provided with strengthening ribs 6, and at its two opposite ends are inclined faces 7. On these faces are placed locking bolts 8 which pass through slots 9 in enlargements 10 of the lid and because of the inclination of the faces 7 and their own weight automatically drop into the positions shown in Figs. 2 and 3, in which positions, when the lid has entered the vessel 1, they engage the recesses 4 as clearly seen in Fig. 3. As also shown in this figure, the ends of the bolts are slightly bent upwards being rounded off, so that as the lid 5 is forced down into the vessel 1, the ends of the bolts easily slip past the projections 11 between the recesses, whereas any upward movement of the lid 5 is resisted by the ends of bolts bearing against the straight faces of the said recesses rounded below to permit the ends of the bolts to pass. The bolts are provided with finger-pieces 12 whereby they may be easily withdrawn from the recesses to release lid 5.

For forcing the lid down into the vessel to compress the hams placed therein, the lid is provided in its center with a cam-like elevation 13 projecting above the plane of the lid. On one of the side walls of vessel 1 are formed depending curved lugs 14 (Figs. 1, 2 and 4) which act as a fulcrum for a hand-lever 15, which for that purpose is formed at its one end with pivot-pins 16 adapted to engage said curved lugs 14. The lever, when thus placed in its fulcrum, is pressed down onto the cam-like elevation 13 of the lid 5, which is thereby gradually forced down into the vessel compressing the hams 17 indicated in Fig. 2 by the broken lines. As the lid is forced down into the vessel below its upper rim, the ends of the locking bolts engage the recesses 4 thereby holding the lid in position, after the pressure thereon is relieved. The locking bolts are provided with punched up portions, clearly shown in Fig. 3, to prevent the bolts from sliding into the recesses too far.

Where two or more hams are placed in the vessel, a partition 18 (Fig. 2) is placed between each two hams, to prevent the hams from sticking together. The upper surface of the partition 18 has a groove 19 in which rests a ring 20, by which the partition can be easily lifted out or placed in the vessel.

The ham boiler as shown and above described is of course capable of many variations and therefore, I do not wish to be limited to the construction as shown, which I have used by way of illustration only.

I claim as my invention:

1. A ham-boiler comprising a vessel adapted to receive the ham and provided with inner recesses at its opposite ends, a lid snugly fitting into said vessel, and gravity controlled slidable locking bolts provided on top of said lid so as to automatically engage said recesses, as the lid is being forced into said vessel, to thereby prevent outward movement of the said lid.

2. A ham-boiler, as specified in claim 1, in which the lid is formed with inclined faces for the bolts to enable them to automatically slide into locking engagement with the recesses in the vessel.

3. A ham-boiler as specified in claim 2, in which the ends of the bolts are curved to enable them to move over and past the rounded edges of the projections between the recesses.

4. A ham-boiler comprising a vessel having a row of inner recesses at opposite ends, a lid snugly fitting into said vessel and having a central cam-like elevation, and inclined faces at its ends, movable locking bolts placed on said inclined faces so as to automaticallly engage said recesses as the lid is being forced into the vessel, a fulcrum provided on one side wall of the vessel, a separate hand-lever having means for engaging said fulcrum and adapted to be pressed down onto said cam-like elevation, and a loose partition fitting in said vessel adapted to be placed between two hams.

In testimony whereof, I hereunto affix my signature.

JOSEF REINARTZ.